United States Patent
Tsai

(10) Patent No.: US 8,310,969 B2
(45) Date of Patent: Nov. 13, 2012

(54) MOBILE DEVICE AND POWER SAVING METHOD THEREOF

(75) Inventor: Chuan-Ming Tsai, Taipei County (TW)

(73) Assignee: ACER Incorporated, Taipei County (TW)

( * ) Notice: Subject to any disclaimer, the term of this patent is extended or adjusted under 35 U.S.C. 154(b) by 342 days.

(21) Appl. No.: 12/603,770

(22) Filed: Oct. 22, 2009

(65) Prior Publication Data

US 2011/0007679 A1    Jan. 13, 2011

(30) Foreign Application Priority Data

Jul. 10, 2009    (TW) .............................. 98123545 A

(51) Int. Cl.
*G08C 17/00*    (2006.01)

(52) U.S. Cl. ........................................ 370/311; 370/310

(58) Field of Classification Search .......... 370/310–311, 370/329, 350
See application file for complete search history.

(56) References Cited

U.S. PATENT DOCUMENTS

| | | | |
|---|---|---|---|
| 7,957,332 B1* | 6/2011 | Chow et al. .................... 370/311 |
| 2002/0187804 A1* | 12/2002 | Narasimha et al. ........... 455/552 |
| 2004/0022188 A1 | 2/2004 | Abel | |
| 2009/0111524 A1* | 4/2009 | Basaralu ....................... 455/559 |
| 2009/0135751 A1* | 5/2009 | Hodges et al. ................ 370/311 |
| 2009/0185794 A1* | 7/2009 | Kim .............................. 386/124 |
| 2010/0069127 A1* | 3/2010 | Fiennes ......................... 455/574 |
| 2010/0161980 A1* | 6/2010 | Sood ............................. 713/168 |

\* cited by examiner

*Primary Examiner* — Phuc Tran

(74) *Attorney, Agent, or Firm* — WPAT, P.C.; Anthony King

(57) ABSTRACT

The present invention discloses a mobile device and a power saving method thereof. The mobile device comprises a modem processor and a data processor. The modem processor is electrically connected to a wireless network system for receiving/transmitting a network packet. When the data processor is in a hibernation mode, the IP packet protocol module of the modem processor unpacks the received network packets to access the packet data. If it is determined that the packet data need to be processed by the data processor, the modem processor wakes up the data processor; whereas the data processor remains in the hibernation mode. Thus, the time period in which the data processor is in the hibernation mode is extended so as to achieve power saving effect.

12 Claims, 4 Drawing Sheets

MOBILE DEVICE AND POWER SAVING METHOD THEREOF

BACKGROUND OF THE INVENTION (a) Field of the Invention

The present invention relates to a mobile device and a power saving method thereof, and more particularly to the technical field in which a modem processor unpacks a network packet according to an IP packet protocol, and then determines whether or not to wake up a data processor according to the packet data in the network packet.

(b) Description of the Prior Art

Today, with the increasing popularization of new generation wireless communication systems, mobile devices may provide users on the go wireless web surfing, web page browsing or network service with broader bandwidths. The more versatile mobile devices are, and the more frequent users operate the mobile devices. As a result, it is easy for a user to sense the problem that a mobile device is low power and the operation time is too short.

In order to reduce the power consumption of the mobile devices to increase their operation time, the highest power-consuming processors in most mobile devices would enter a hibernation mode to achieve power saving effect during the time period in which the users do not operate them. However, in case that the user is using a specific network service, such as push mail service or IM service, the remote servers associated with the service still continue to transmit the network packets to the mobile device even though the user does not operate the mobile device. This causes the processor in the hibernation mode to be woken up continuously to process the packet data.

The shortening of the hibernation time of the processor causes poor performance of the above power saving method. Even if the user does not operate the mobile device, the processor remains in an operation mode for a long time but not in a hibernation mode so that the mobile device consumes unnecessary power.

SUMMARY OF THE INVENTION

In view of the above-mentioned problems of the prior art, one object of the present invention is to provide a mobile device and a power saving method thereof, which may extend the hibernation time of the data processor so as to reduce the power consumption of the mobile device.

According to another object of the present invention, there is provided a mobile device used in a wireless network system. The mobile device includes a modem processor and a data processor. The modem processor is electrically connected to the wireless network system for receiving/transmitting a network packet, and the modem processor has an IP packet protocol module. The data processor is connected via the modem processor to the wireless network system for network service. When the data processor is in a hibernation mode, said IP packet protocol module unpacks the received network packet to access packet data and the modem processor selectively wakes up the data processor according to the packet data.

The IP packet protocol is preferably a push mail protocol module or an instant message (IM) protocol module.

The modem processor wakes up the data processor when the modem processor determines that the packet data need to be processed by the data processor.

The modem processor further comprises a storage buffer. The packet data are stored in the storage buffer when the modem processor determines that it is not necessary to wake up said data processor according to the packet data.

According to a further object of the present invention, there is provided a method of power saving on a mobile device. The mobile device includes a modem processor and a data processor, and the modem processor receives at least one network packet. The method of power saving comprises the following steps. It is determined whether or not said data processor is in a hibernation mode. Said modem processor unpacks the received network packet according to an IP packet protocol to access packet data when the data processor is in the hibernation mode. Then, the modem processor selectively wakes up the data processor according to the packet data.

The IP packet protocol is a push mail protocol or an instant message (IM) protocol.

The method of power saving further comprises the step of waking up the data processor when the modem processor determines that the packet data need to be processed by the data processor.

When the modem processor further comprises a storage buffer, the method of power saving further comprises the step of storing the packet data in the storage buffer when the modem processor determines that it is not necessary to wake up the data processor according to the packet data.

DETAILED DESCRIPTION OF THE PREFERRED EMBODIMENTS

Figure 1:
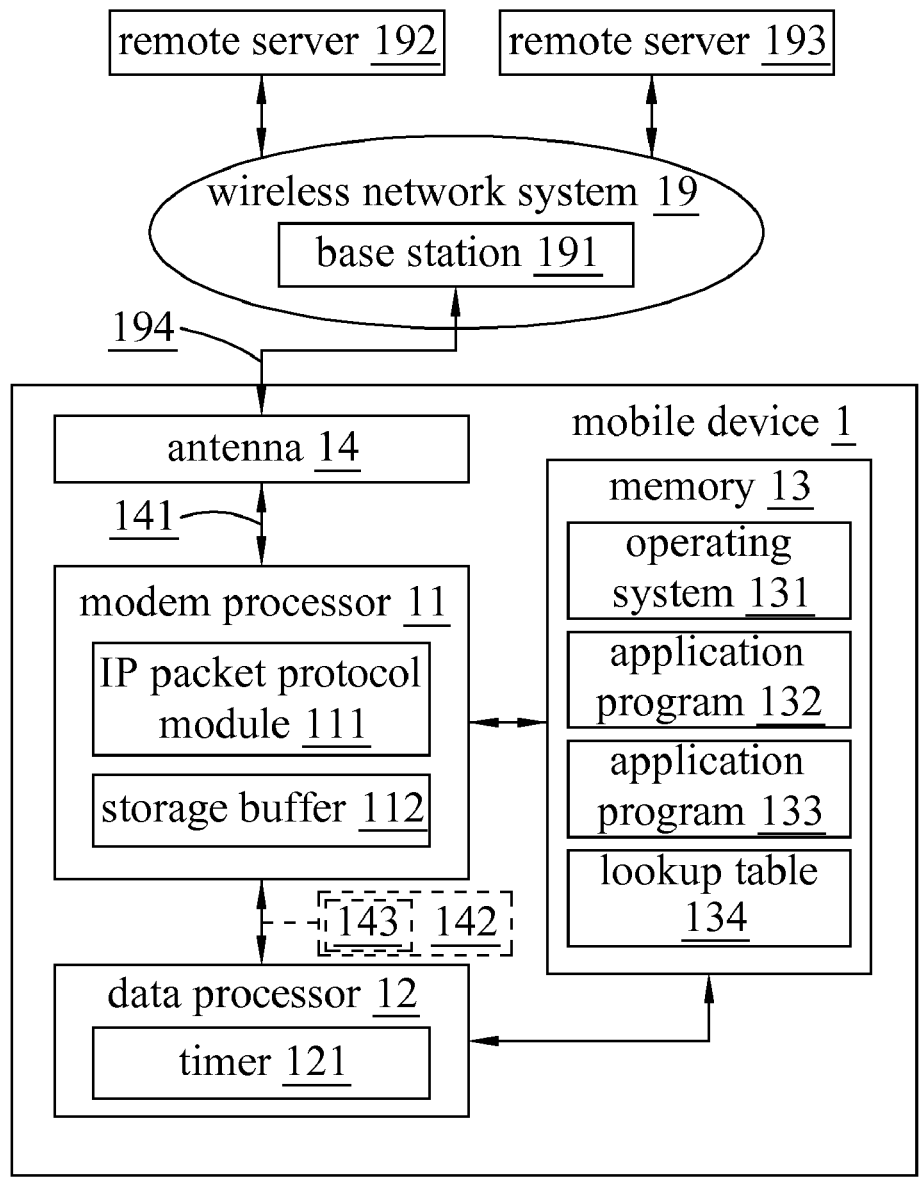
FIG. 1 is a block diagram showing an embodiment of a mobile device according to the present invention.

Referring to FIG. 1, a block diagram showing an embodiment of a mobile device according to the present invention is illustrated. In this figure, the mobile device 1 includes a modem processor 11, a data processor 12, a memory 13, and an antenna 14. The memory 13 is used to store digital data, such as an operating system 131 and application programs 132, 133 executed by the data processor 12, as well as the data generated by the data processor 12. The antenna 14 receives a radio wave 194 sent from a base station 191 in a wireless network system 19 and converts the radio wave 194 into an analog signal 141 including a network packet 142. Or, the antenna 14 receives an analog signal 141 from the modem processor 11 and converts the signal into a radio wave 194 and then transmits it to the base station 191.

The modem processor 11 is electrically connected via the antenna 14 to the wireless network system 19 for receiving the network packet 142 from the base station 191 or transmitting the network packet 142 to the base station 191 via the antenna 14. The modem processor 11 is used to convert the analog signal 141 including the network packet 142 into a network packet 142 in a digital format, which may be processed by the data processor 12. In addition to modulation and demodulation functions, the modem processor 11 has an IP packet protocol module 111 and a storage buffer 112. The IP packet protocol module 111 may unpack the network packet 142 to access the packet data 143 in the network packet 142. The wireless network system 19 is preferably a WIFI system, a GPRS system, or a 3G system, or other network systems that enable wireless transmission of the packets. The function of the IP packet protocol module 111 is to add at least one packet header corresponding to the IP packet protocol to data content so as to create a network packet; or to remove the header from the network packet according to the IP packet protocol; or to generate a query packet or a response packet that conforms to the IP packet protocol.

The data processor 12 executes the operating system 131 to provide an execution environment for the application programs 132, 133. When the application programs 132, 133 are executed, the mobile device may be connected via the wireless network system 19 to remote servers 192, 193 for network service. For example, the application program 132 may be an instant message (IM) program which enables connection to an instant message server 192 so that the user and his/her friends may send instant messages to each other on the mobile device 1. The application program 133 may be a push mail receiving program which enables connection to a push mail server 193. Once the push mail server 193 receives a new mail, it sends the new mail to the mobile device 1 so that the user may receive the new mail in real time.

In order to reduce the unnecessary power consumption of the mobile device 1, the data processor 12 enters a hibernation mode to reduce the power consumption when not operated. For example, when the time period in which the data processor 12 does not receive any operation instruction and which is counted by the timer 121 in the data processor 12 exceeds a preset time period, it means that the user does not operate the mobile device 1 during the preset time period and will not operate the mobile device 1 during a short time period. Because the data processor 12 is a higher power-consuming component in the mobile device 1, the data processor 12 may enter a hibernation mode to reduce the power consumption of the mobile device 1.

However, when the data processor 12 is in the hibernation mode, the remote server 192 or 193 still continues to transmit the network packets to the mobile device 1 if the user has executed the application program 132 or 133 and has not logged out or terminated the application program. The packet data 143 in some network packets are mails, text messages or image messages, or the like that the user is interested in. But most of the packet data 143 are only acknowledgement messages (ACK) for communication protocols, for example, when some protocols (such as Direct Push protocol or IMAP Push protocol) are in use, the server will send an acknowledgement message that requests the terminal unit to reply its status every 5 to 8 minutes; or when some instant message (IM) protocols are in use, the server will send a status update message to the terminal unit if other contact persons change their statuses (such as log in, log out, or exit). The above-mentioned acknowledgement messages or update messages are the less important data to the user. If the data processor 12 is woken to process these acknowledgement messages or update messages, the hibernation time of the data processor 12 will be shortened. This leads to poor power-saving performance.

Therefore, in order to achieve power saving effect, when the data processor 12 is in the hibernation mode, the IP packet protocol module 111 unpacks the network packet 142 to access the packet data 143 after the modem processor 11 receives the network packet 142. The modem processor 11 selectively wakes up the data processor 12 according to the packet data 143. If the packet data 143 are important data, the data processor 12 is woken up to process them; otherwise, the data processor 12 remains in the hibernation mode. If the packet data 143 are not important data, the modem processor 11 may abandon the packet data 143 or temporarily stores them in the storage buffer 112. The data in the storage buffer 112 may be transmitted to the data processor 12 until the next time the data processor 12 is woken up. For example, update messages may be stored in the storage buffer 112 so that all the update messages may be read when the data processor 12 has been woken up.

The memory 13 may store a lookup table 134 that records types of important messages. Consequently, when the modem processor 11 determines which type of packet data 143 is an important message, it may read the lookup table 134 and compare the packet data 143 with the data recorded in the lookup table 134 and then determines the importance of the packet data 143 according to the comparison result. In this manner, the system designers of the mobile device 1 may adjust the recorded data in the lookup table 134 according to the service provided by the mobile device 1, so as to enhance the above-described effect of prolongation of the hibernation time of the data processor 12.

Figure 2:
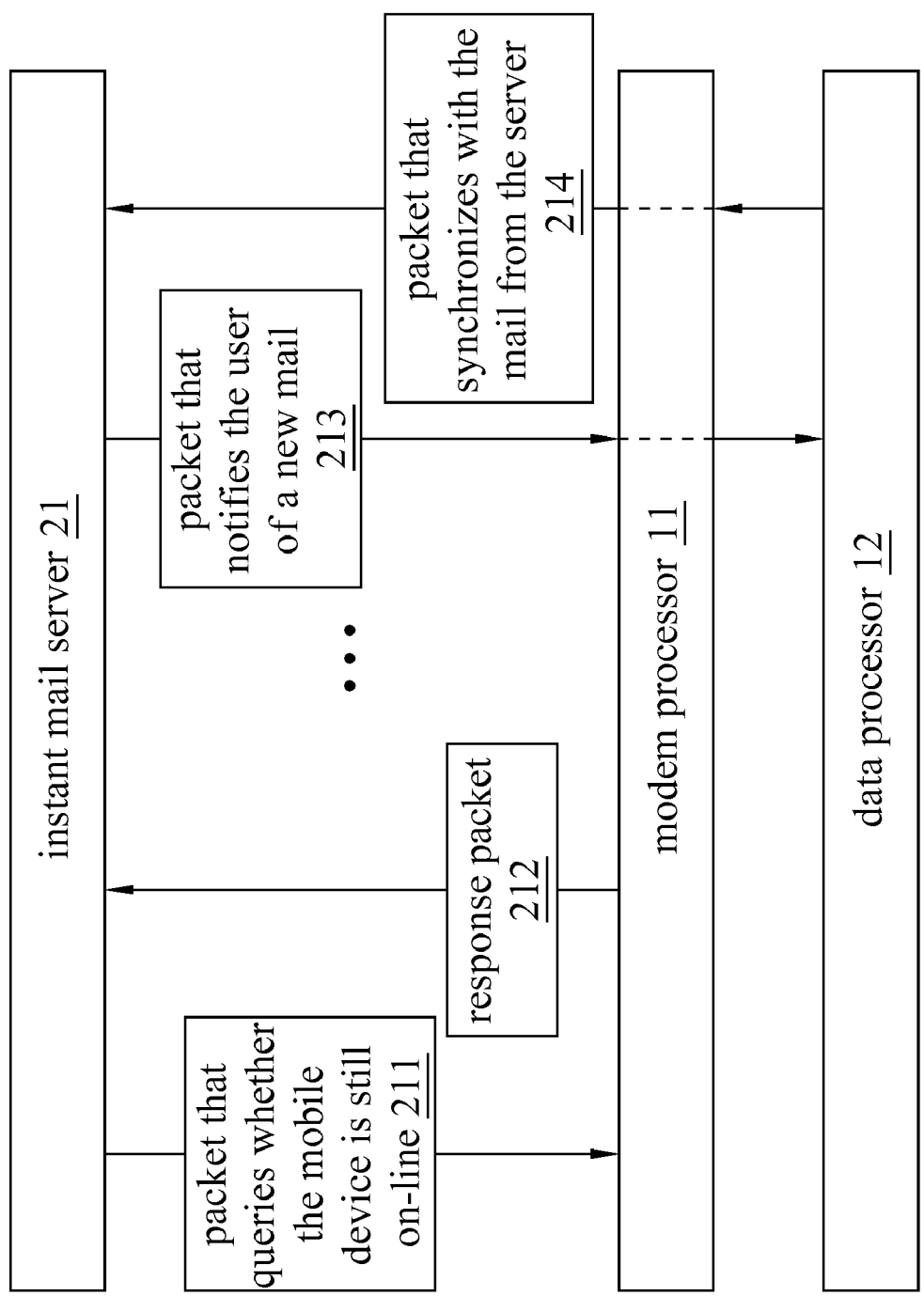
FIG. 2 is a schematic view of packet transmission between a mobile device and a remote server according to the present invention.

In addition to filtering the packet data, the modem processor 11, if necessary, may create a response packet to reply the remote server so as to maintain the network service. Thus, the network service continues immediately after the data processor 12 has been woken up. Referring to FIG. 2, a schematic view of packet transmission between a mobile device and a remote server according to the present invention is illustrated. After the data processor 12 enters the hibernation mode, an instant mail server 21 regularly transmits a packet 211 that queries whether the mobile device 1 is still on-line. If there is no response, the instant mail server 21 considers that the mobile device 1 has exited from the wireless network system 19. As a result, the instant mail service corresponding to the mobile device 1 is canceled and the resource is allocated to other terminal units. To maintain the network service, the IP packet protocol module 111 generates and sends a response packet 212 back to the instant mail server 21 when the modem processor 11 determines that the packet is not an important datum and it is not necessary to wake up the data processor 12. In this manner, the data processor 12 may be in the hibernation mode as well as the network service may be maintained. When the modem processor 11 receives a packet 213 that notifies the user of a new mail and determines that the packet is an important datum, it wakes up the data processor 12 to generate a packet 214 that synchronizes with the mail from the server. It begins to receive new mails from the instant mail server 21. In addition to generating the response packets, the IP packet protocol module 111 may regularly generate and transmit a query packet that queries whether there are new mails or data to be updated in the remote server to the remote server.

When the data processor 12 is in the hibernation mode, the IP packet protocol module 111 unpacks network packets. When the data processor 12 is not in the hibernation mode, network packets may be unpacked by the data processor 12, that is, the modem processor 11 transmits the received network packets 142 to the data processor 12, which unpacks the network packets 142 according to the IP packet protocol. Alternatively, even if the data processor 12 is not in the hibernation mode, the network packets 142 may also continue to be unpacked by the IP packet protocol module 111.

Figure 3:
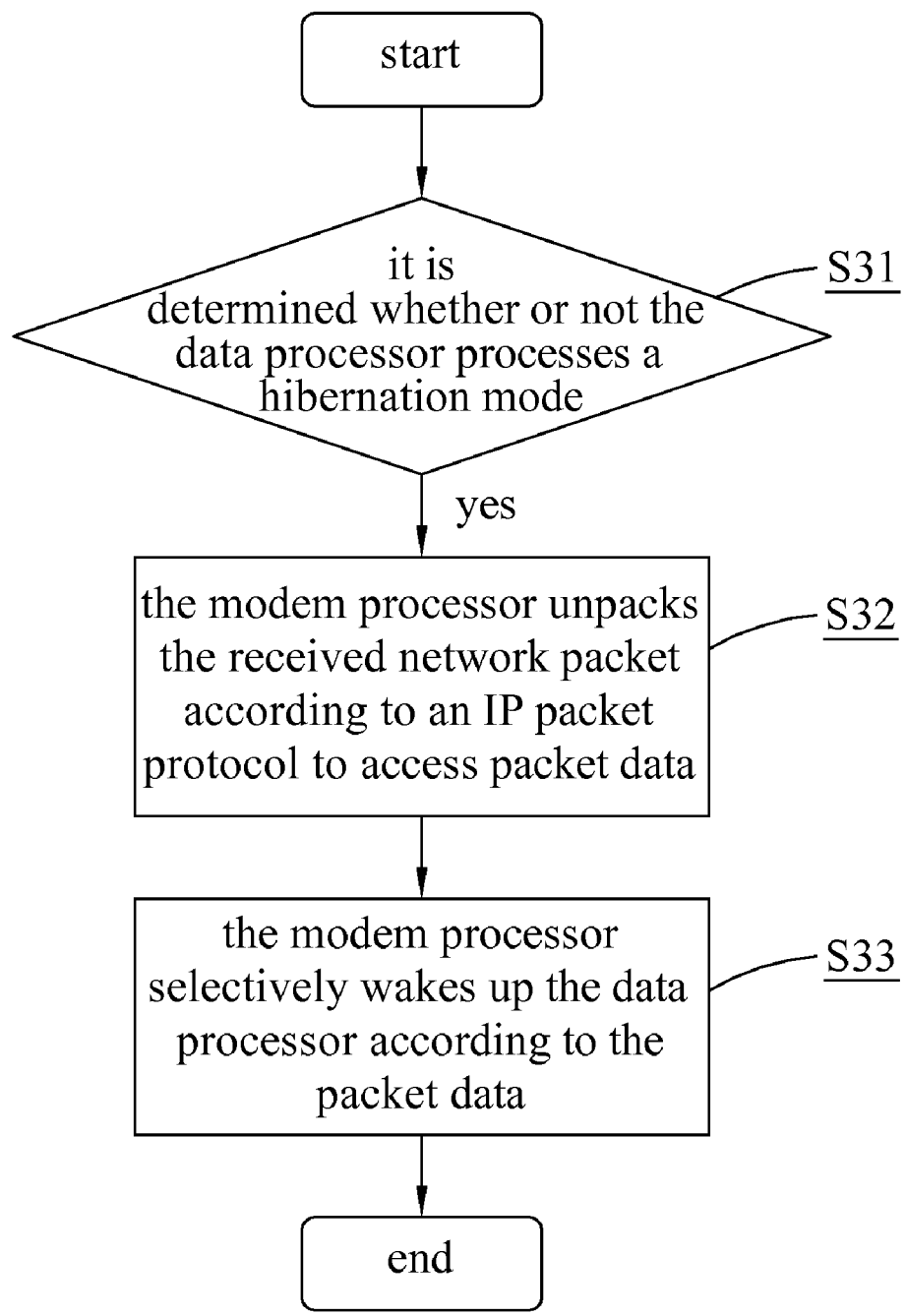
FIG. 3 is a flow chart showing the steps of a method of power saving on a mobile device according to the present invention.

Referring to FIG. 3, a flow chart showing the steps of a method of power saving on a mobile device according to the present invention is illustrated. In this figure, the method of power saving is used on a mobile device having a modem processor and a data processor. The modem processor may receive at least one network packet. The method comprises the following steps. In step S31, it is determined whether or not the data processor is in a hibernation mode. If yes, in step S32, the modem processor unpacks the received network packet according to an IP packet protocol to access packet data. Then, in step S33, the modem processor selectively wakes up the data processor according to the packet data. In practice, if it is determined that the packet data are important data, the modem processor wakes up the data processor; otherwise, the data processor remains in the hibernation mode.

Figure 4:
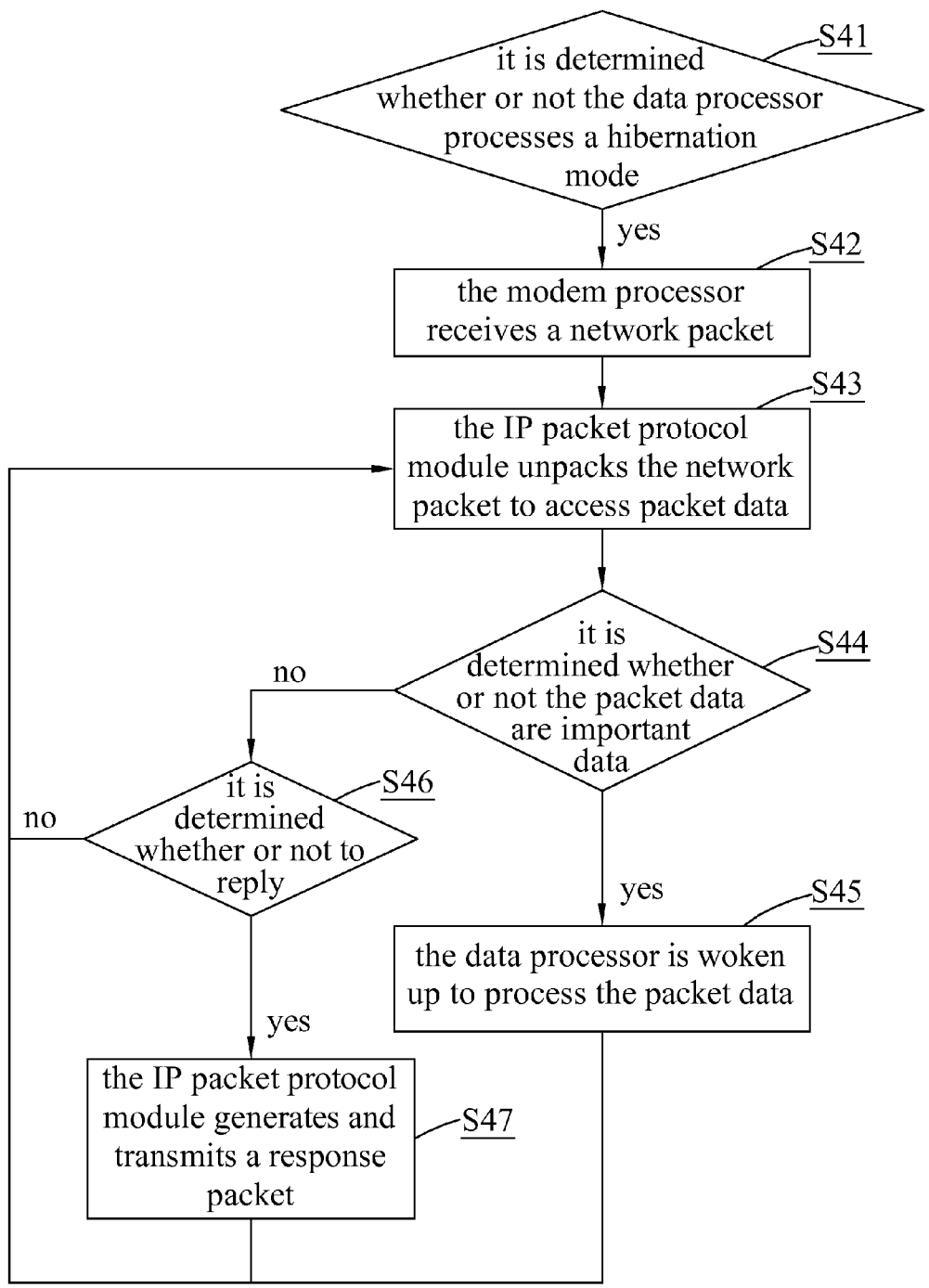
FIG. 4 is a flow chart of the implementation of a method of power saving on a mobile device according to the present invention.

Referring to FIG. 4, a flow chart of the implementation of a method of power saving on a mobile device according to the present invention is illustrated. In this figure, this embodiment is utilized in the mobile device 1 shown in FIG. 1 and comprises the following steps. First, in step S41, it is determined whether the number counted by the timer 121 exceeds a preset threshold value. If yes, it means that it has been a long time since the user operated the mobile device 1, so the data processor may be ready to enter a hibernation mode for power saving. If the data processor 12 is in the hibernation mode, the modem processor 11 receives a network packet 142 in step S42. In step S43, the IP packet protocol module 111 unpacks the network packet 142 to access the packet data 143. Then, in step S44, it is determined whether or not the packet data 143 are important data, like the information that needs to be known by the user, such as new mail notifications or new messages, etc. Here, the determining step may be performed in such a manner that the IP packet protocol module 111 compares the packet data 143 with the lookup table 134.

If it is determined that the packet data 143 are important data, the data processor is woken up to process the packet data 143 in step S45. Then, it goes back to step S43. If it is determined that the packet data 143 are not important data, such as acknowledgement messages or update messages, it is determined whether or not to reply in step S46. If yes, in step S47, the IP packet protocol module 111 generates and transmits a response packet to the corresponding remote server. Then, it goes back to step S43. If it is determined that it is not necessary to reply to the packet data, the packet data are abandoned and then it goes back to step S43. Moreover, in practice, besides determining whether or not to reply to the packet data 143, a determining step may be added to determine whether the packet data 143 must be temporarily stored in the storage buffer 112 so that all the update messages may be read until the data processor is woken up.

The above description is illustrative only and is not to be considered limiting. Various modifications or changes can be made without departing from the spirit and scope of the invention. All such equivalent modifications and changes shall be included within the scope of the appended claims.

What is claimed is:

1. A mobile device used in a wireless network system, comprising:
    a modem processor electrically connected to said wireless network system to receive/transmit a network packet, said modem processor including an IP packet protocol module and a storage buffer; and
    a data processor connected via said modem processor to said wireless network system for network service;
    wherein when said data processor is in a hibernation mode, said IP packet protocol module unpacks said received network packet to access a packet data and said modem processor selectively wakes up said data processor according to said packet data;
    wherein when said modem processor determines that said packet data needs to be processed by said data processor, then said modem processor wakes up said data process by sending said packet data to said data processor;
    wherein when said modem processor determines that said packet data is not necessary to wake up said data processor, then said modem processor sends said packet data to said storage buffer.

2. The mobile device as claimed in claim 1, wherein said IP packet protocol module is a push mail protocol module or an instant message (IM) protocol module.

3. The mobile device as claimed in claim 1, wherein said modem processor transmits the packet data stored in said storage buffer to said data processor when said data processor is woken up.

4. The mobile device as claimed in claim 1, wherein said modem processor transmits said received network packet to said data processor which unpacks said network packet according to said IP packet protocol when said data processor is not in said hibernation mode.

5. The mobile device as claimed in claim 1, wherein said IP packet protocol module generates and transmits a response packet to said wireless network system according to said network packet when said data processor is in said hibernation mode.

6. The mobile device as claimed in claim 1, wherein said IP packet protocol module generates and transmits a query packet to said wireless network system according to said IP packet protocol when said data processor is in said hibernation mode.

7. A power saving method for a mobile device, said mobile device including a modem processor and a data processor, said modem processor comprising a storage buffer and receiving at least one network packet, said power saving method comprising the steps of:
    determining whether or not said data processor is in a hibernation mode;
    said modem processor unpacking said received network packet according to an IP packet protocol to access a packet data when said data processor is in said hibernation mode;
    said modem processor selectively waking up said data processor according to said packet data;
    sending said packet data to said data processor when said modem processor determines that said packet data need to be processed by said data processor; and
    storing said packet data to said storage buffer when said modem processor determines that it is not necessary to wake up said data processor according to said packet data.

8. The power saving method as claimed in claim 7, wherein said IP packet protocol is a push mail protocol or an instant message (IM) protocol.

9. The power saving method as claimed in claim 7, further comprising a step of:
    said modem processor transmitting the packet data stored in said storage buffer to said data processor when said data processor is woken up.

10. The power saving method as claimed in claim 7, further comprising a step of:
    said modem processor transmitting said received network packet to said data processor which unpacks said network packet according to said IP packet protocol when said data processor is not in said hibernation mode.

11. The power saving method as claimed in claim 7, further comprising a step of:

said modem processor generating and transmitting a response packet to a wireless network system according to said received network packet and said IP packet protocol when said data processor is in said hibernation mode.

12. The power saving method as claimed in claim 7, further comprising a step of:

said modem processor generating and transmitting a query packet to a wireless network system according to said IP packet protocol when said data processor is in said hibernation mode.

* * * * *